2 Sheets—Sheet 2.

J. NESBITT.
Electric Railway-Semaphore.

No. 225,633. Patented Mar. 16, 1880.

Witnesses:
Louis W. Kish
Gordon Aird

Inventor:
Josiah Nesbitt
by Ridout Aird & Co
Attys

UNITED STATES PATENT OFFICE.

JOSIAH NESBITT, OF TORONTO, ONTARIO, ASSIGNOR TO MARY WATSON, OF MONTREAL, CANADA.

ELECTRIC RAILWAY-SEMAPHORE.

SPECIFICATION forming part of Letters Patent No. 225,633, dated March 16, 1880.

Application filed December 11, 1879.

*To all whom it may concern:*

Be it known that I, JOSIAH NESBITT, of the city of Toronto, in the county of York, in the Province of Ontario, Canada, mechanic, have invented certain new and useful Improvements in Railway-Semaphores, which improvements are fully set forth in the following specification and accompanying drawings.

The object of the invention is to provide simple and effective mechanism for operating railway signals or semaphores; and it consists, first, in a simple combination of gearing operated by a weight, and so arranged that the strength of the electro-magnet need not be in proportion to the said weight; and the invention consists in a certain combination of mechanism hereinafter specified.

Figure 1:
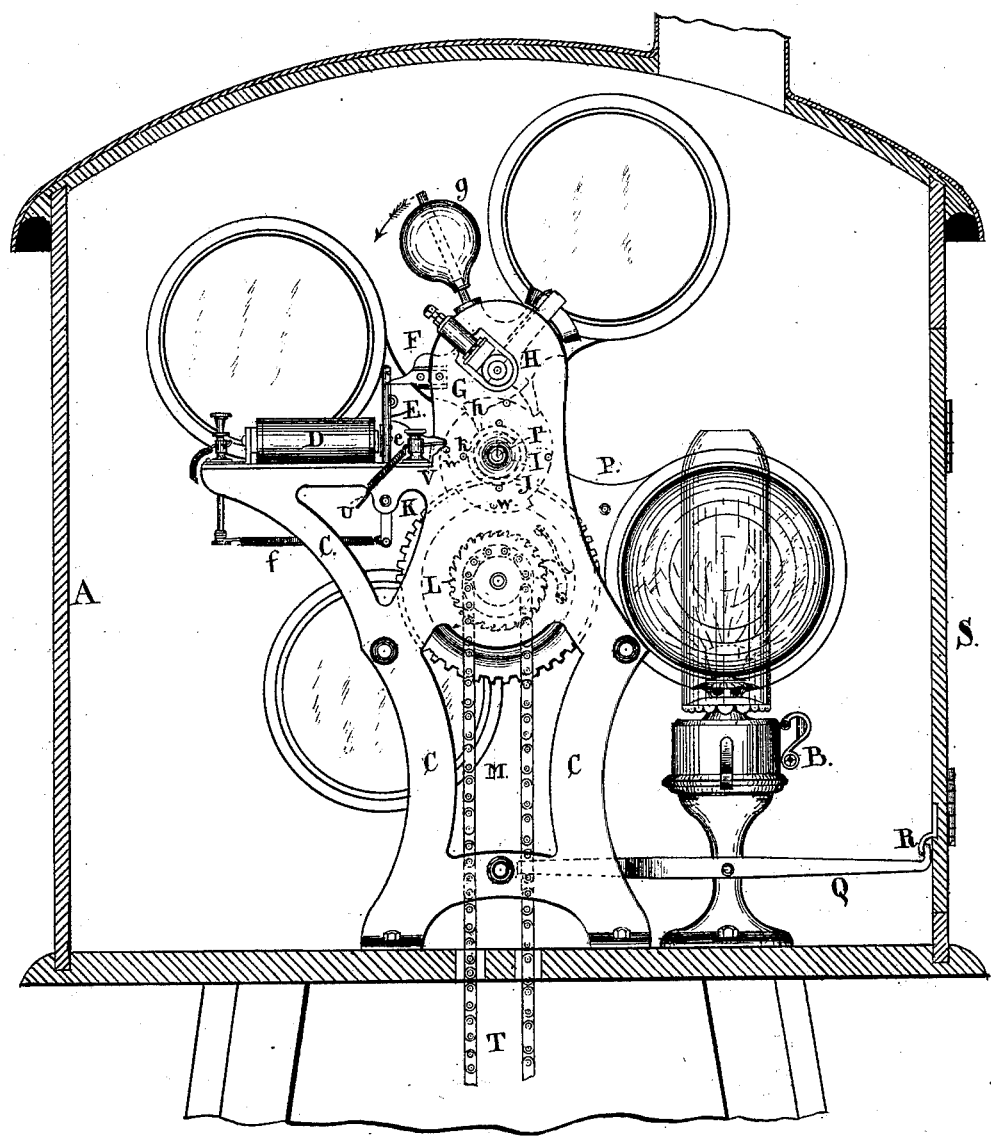
Figure 2:
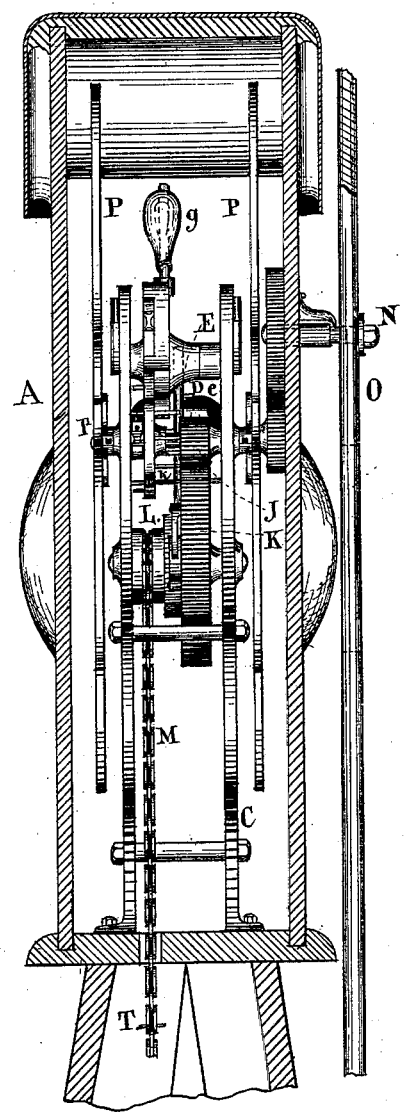

Figure 1 is a side elevation; Fig. 2, a cross-section.

In the drawings, A represents a box, which may be made of any material and design suitable for containing the lamp B and the mechanism hereinafter described. C is a metal frame for supporting the said mechanism. D is an electro-magnet suitably fastened to the frame C, and properly connected by wires to a battery and circuit-breaker placed at a point from which the signal should be manipulated. E is a lever pivoted to the frame C, and provided with an armature, e. f is a spring, placed as shown, to draw the armature e from contact with the electro-magnet whenever the current is broken. F is an arm attached to or forming part of the tumbling-plate G, and whose end rests upon the lever E when the armature e is not in contact with the electro-magnet c.

The dog H is pivoted on the same pin as the plate G, but moves independently. One wing of this dog H fits into the ratchet-wheel I, and its other wing between two blocks or their equivalent on the tumble-plate G. The ratchet-wheel I is keyed to the same spindle I' as the spur-pinion J, which meshes into the spur-wheel K. This latter wheel K is keyed to the same spindle as the toothed wheel L, around which hangs the chain M, upon one end of which a suitable weight is hung. So long as the dog H is in gear with the ratchet-wheel I the full power and resistance produced by the weight on the end of the chain M is sustained by the said dog, and the gearing consequently remains stationary till the dog H is thrown clear of the ratchet, when, of course, the gearing revolves from the action of the said weight.

The tumbling-plate G is so balanced on its spindle by a weight, g, or otherwise, that unless supported it will fall in the direction indicated by the arrow, and, being placed in the relation to the dog H described, strikes it sufficiently hard to knock it out of gear with the ratchet-wheel I, which latter immediately revolves till one of the pins k, placed in its face, comes in contact with the arm h on the tumbling-plate G, which action turns the plate G back into the position from which it has just fallen, carrying with it the dog H again into gear with I, as will be understood by reference to the drawings.

The gearing just described is designed to operate the semaphore-arm O, which is keyed to the spindle N, and geared, as shown, with the spindle I', to which the ratchet-wheel I is also keyed, and as this has only four teeth, at equal distance apart, each movement of the wheel I gives the semaphore an eighth of a turn, the gearing between the two spindles N and I' being as two is to one.

With the view of signaling at night, I key onto the spindle I' the spiders P, having four eyes, each of a different-colored glass. These eyes are so placed that at each stoppage of the wheel I one of them remains opposite to a properly-protected hole in the box A, immediately in front of the lamp B, thus indicating by the color of the glass the signal which the position of the semaphore-arm O represents.

As it sometimes happens that the arm will be opposite to the hole above referred to, corresponding holes are made in the arm O, so that the signal-light shall not at any time be obscured.

At the commencement of the specification I refer to an electro-magnet, D, suitably located for the purpose of actuating a properly-magnetized lever, E, which lever is so placed that when in a certain position it supports the arm F on the plate G, holding the dog H in gear with the ratchet-wheel, and thereby supporting the weight N without sustaining any strain therefrom.

From this description it will be seen that a very weak electro-magnet will answer the purpose, while at the same time as heavy a weight as the material of the gearing will sustain may be hung upon the chain M. To attain this effect is really the essence of the invention, as the motion of the semaphore can thereby be depended upon, provided the weight is wound up, to insure which I pivot to the lamp-stand or any suitable place a lever, Q, one end of which is forked to allow the chain to pass freely through it, the other end being crooked, so as to engage with the catch R, secured to the door S, as shown. When the door S is closed the crooked lever Q securely locks it, as the forked end of the lever is heavier than the other.

By placing a pin, T, through the chain M near the weight, and having no other obstruction on the chain M, the said chain will pass freely through the forked end, as before referred to, except when the pin T comes in contact with it; consequently the door remains locked, except when opened by the pin coming in contact with the lever. By this arrangement it is absolutely necessary to wind up the weight before the door S can be opened or the lamp B lighted.

I have not referred particularly to the battery and circuit-breaker for operating the mechanism herein described, as any electrician will understand how to arrange the same. It is, however, important to mention that in order that the operator may know in what position the semaphore stands, I arrange immediately over or near the circuit-breaker a dial with a needle to indicate the position of the said semaphore, which needle is connected to the frame C by a properly-charged wire, U, and otherwise arranged, so that when the current is broken in the said wire U the needle moves a given distance on the dial, and thus indicates as required.

With the view of securing the automatic action of this signal I attach to the binding-post of the wire U a spring, V, of platinum or other suitable material, and place four brass pins, W, in the ratchet-wheel I, so that at each movement of the said wheel one of the pins W comes in contact with the spring V, thereby conveying the desired signal.

What I claim as my invention is—

In an electro-magnetic railway-signaling apparatus, the frame C, lever E, pivoted thereto and having the armature e and spring f, balanced tumbling-plate G, having the arms F and h, ratchet-wheel I, provided with pins k and W, dog H, resting between blocks on the tumbling-plate and engaging with the ratchet-wheel I, weighted chain M, and gearing suitably mounted, combined with the electro-magnet D, wire U, and spring V, substantially as and for the purpose specified.

JOSIAH NESBITT.

Witnesses:
DONALD C. RIDOUT,
H. WELLS.